United States Patent [19]

MacPhail

[11] Patent Number: 5,051,891
[45] Date of Patent: Sep. 24, 1991

[54] METHOD TO MANAGE TRANSFER OF OWNERSHIP OF ELECTRONIC DOCUMENTS STORED IN AN INTERACTIVE INFORMATION HANDLING SYSTEM

[75] Inventor: Margaret G. MacPhail, Austin, Tex.

[73] Assignee: International Business Machines Corporation, Armonk, N.Y.

[21] Appl. No.: 138,537

[22] Filed: Dec. 23, 1987

[51] Int. Cl.$^5$ ............................................. G06F 15/40
[52] U.S. Cl. ................................. 364/200; 364/282.1; 364/282.4; 364/282.2; 364/283.3; 364/285.0; 364/286.6
[58] Field of Search ... 364/200 MS File, 900 MS File, 364/300

[56] References Cited

U.S. PATENT DOCUMENTS

| | | | |
|---|---|---|---|
| 4,503,499 | 3/1985 | Mason et al. | 364/200 |
| 4,742,467 | 5/1988 | Messerich et al. | 364/200 |
| 4,761,737 | 8/1988 | Duvall et al. | 364/300 |
| 4,782,442 | 11/1988 | Kojima et al. | 364/200 |
| 4,835,735 | 5/1989 | Ikegami et al. | 364/900 |

Primary Examiner—Gareth D. Shaw
Assistant Examiner—Maria Napiorkowski
Attorney, Agent, or Firm—Richard E. Cummins; H. St. Julian

[57] ABSTRACT

A method for use in an interactive information handling system which manages a relatively large plurality of electronic documents for a plurality of end users in which an end user who is not the owner of a document, may request a delayed copy of the document to be furnished only at the time that the owner's copy of the document is to be deleted from the system. A Delayed Copy Request (DCR) is entered into the system interactively by the non-owner end user when a screen is displayed on the end user's terminal. This screen prompts the end user for the information required by the system to subsequently present to the end user document owner. At the time the document is to be deleted, the information is redisplayed to the document owner which allows the owner to decide if the request should be honored.

9 Claims, 12 Drawing Sheets

|   MAIN ACTION MENU  -  REQUESTER   |
|---|

| X | LIBRARY SERVICES |
|   | MAIL SERVICES |
|   | SYSTEM ADMINISTRATION SERVICES |

FIG. 4a

| LIBRARY SERVICES SUB-ACTION MENU  -  REQUESTER |
|---|

|   | CREATE A DOCUMENT |
|   | COPY DOCUMENT |
|   | UPDATE DOCUMENT CONTENT |
|   | UPDATE DOCUMENT DESCRIPTORS |
|   | UPDATE DOCUMENT ORGANIZATION |
|   | FILE DOCUMENT |
| X | FIND DOCUMENT |
|   | DELETE DOCUMENT |

FIG. 4b

| FIND DOCUMENT MENU - REQUESTER |
|---|

OR ─┬─ SPECIFY EXISTING SEARCH CRITERIA
    └─ SPECIFY NEW SEARCH CRITERIA

OR ─┬─ SPECIFY EXISTING DESCRIPTOR LISTING
    └─ SPECIFY NEW DESCRIPTORS

TO EXIT THIS MENU, PRESS ENTER

FIG. 4c

```
┌─────────────────────────────────────────────────────────────┐
│           FIND DOCUMENT RESULT LIST   -   REQUESTER         │
├─────────────────────────────────────────────────────────────┤
│  ACTIONS   -  COPY   (C)  DELETE  (D)  UPDATE  (U)          │
│  UPDATE DESCRIPTORS  (UD) ACCESS  (UA) CONTENT (UC) ORGANIZE (UD) │
│                                                             │
│  ACTION      NAME      FILE DATE    SUBJECT                 │
│  _____    BUDGET    9/27/88      MONTHLY BUDGET REPORT   │
│  _____    DIARY     6/12/87      YEARLY TRAVEL DIARY     │
│  _____    STATUS    5/16/88      CURRENT STATUS OF PROJECTS │
│  _____    PLAN      10/1/88      PLANS FOR THE COMING HOLIDAYS │
│                                                             │
│     TO EXIT THIS MENU, PRESS ENTER                          │
└─────────────────────────────────────────────────────────────┘
```

FIG. 4d

```
┌─────────────────────────────────────────────────────────────┐
│   COPY MENU FOR PLAN    -    REQUESTER                      │
├─────────────────────────────────────────────────────────────┤
│   DELAYED COPY A    -  YES  -                               │
│                                                             │
│   CHANGE DESCRIPTORS A  -  NO -                             │
│                                                             │
│   CHANGE ACCESS A   -  NO  -                                │
└─────────────────────────────────────────────────────────────┘
```

FIG. 4e

```
┌─────────────────────────────────────────────────────────────┐
│    MAIN ACTION MENU  -  REQUESTER                           │
├─────────────────────────────────────────────────────────────┤
│  X  LIBRARY SERVICES                                        │
│                                                             │
│     MAIL SERVICES                                           │
│                                                             │
│     SYSTEM ADMINISTRATIVE SERVICES                          │
└─────────────────────────────────────────────────────────────┘
```

FIG. 4F

```
┌─────────────────────────────────────────────────────────────────┐
│         FIND DOCUMENT MENU  -  DOCUMENT OWNER                   │
├─────────────────────────────────────────────────────────────────┤
│                                                                 │
│            ┌── SPECIFY EXISTING SEARCH CRITERIA LISTING         │
│      OR ───┤                                                    │
│            └── SPECIFY NEW SEARCH CRITERIA                      │
│                                                                 │
│            ┌── SPECIFY EXISTING DESCRIPTOR LISTING              │
│      OR ───┤                                                    │
│            └── SPECIFY NEW DESCRIPTORS                          │
│                                                                 │
│   TO EXIT THIS MENU, PRESS ENTER                                │
└─────────────────────────────────────────────────────────────────┘
```

FIG. 7c

```
┌─────────────────────────────────────────────────────────────────┐
│       FIND DOCUMENT RESULT LIST  -  DOCUMENT OWNER              │
├─────────────────────────────────────────────────────────────────┤
│   ACTIONS   -  COPY  (C)  DELETE (D)  UPDATE (U)                │
│   UPDATE DESCRIPTORS (UD) ACCESS (UA) CONTENT (UC) ORGANIZE (UD)│
│                                                                 │
│   ACTION      NAME      FILE DATE    SUBJECT                    │
│   _____      BUDGET    9/27/88      MONTHLY BUDGET REPORT      │
│   _____      DIARY     6/12/87      YEARLY TRAVEL DIARY        │
│   _____      STATUS    5/16/88      CURRENT STATUS OF PROJECTS │
│   __D___      PLAN      10/1/88      PLANS FOR THE COMING HOLIDAYS│
│                                                                 │
│   TO EXIT THIS MENU, PRESS ENTER                                │
└─────────────────────────────────────────────────────────────────┘
```

FIG. 7d

```
┌─────────────────────────────────────────────────────────────────┐
│  DELETE MENU FOR PLAN  -  DOCUMENT OWNER                        │
├─────────────────────────────────────────────────────────────────┤
│  SELECT ACTION: DELETE, CONDITIONAL DELETE, TRANSFER OWNERSHIP  │
│  ACTION     --  CONDITIONAL DELETE --                           │
│  TO VIEW LIST OF DELAYED COPY REQUESTERS PRESS FUNCTION KEY     │
└─────────────────────────────────────────────────────────────────┘
```

FIG. 7e

METHOD TO MANAGE TRANSFER OF OWNERSHIP OF ELECTRONIC DOCUMENTS STORED IN AN INTERACTIVE INFORMATION HANDLING SYSTEM

DESCRIPTION

1. Field of Invention

This invention relates in general to methods of managing the retention and deletion of electronic documents stored in an interactive information handling system and in particular to an improved method which allows an end user to store a request in the system for an ownership copy of a specified stored document which is selectively honored by the document owner at the time the original is deleted from the system.

2. Cross-referenced Applications

U.S. application Ser. No. 07/138,231 entitled "A Method for Managing the Retention of Electronic Documents in an Interactive Information Handling System" filed concurrently herewith in the name of M. G. MacPhail, now U.S. Pat. No. 4,899,299 is directed to a method of automatically managing the retention and deletion of stored documents in which the criteria for determining which documents are retained and which documents are deleted is based on first and second expiration dates which reflect different considerations and which are controlled by different entities.

U.S. application Ser. No. 07/138,535 entitled "A Method of Assigning Retention and Deletion Criteria to Electronic Documents Stored in an Interactive Information Handling System" filed concurrently herewith in the name of M. G. MacPhail, is directed to a method of automatically managing the retention and deletion of stored documents in which the set of criteria for determining which documents are retained and which documents are deleted may be entered and verified automatically when at least one item of the set is entered directly by the end user.

BACKGROUND ART

The prior art has disclosed various interactive information handling systems which store electronic documents. These systems vary in complexity and sophistication from the very simple personal computer employed in the home for writing letters to the very large main frame data processing systems in which thousands of users nodes interact with each other and with a centralized library or file of information. An example of a sophisticated system that is currently in use by several large governmental agencies and private corporations is the system referred to as PROFS that is marketed by the IBM Corporation. These types of systems store and manage millions of documents ranging from one page memos and messages to multi-page reports that might involve several printed volumes. In many of these systems, the need for hard copy no longer exists, so the only copy of the information is the originally generated electronic copy.

The management and control of the paper flow in any large enterprise, be it a governmental agency or a private corporation, requires a set of procedures which define how various types of communications or documents are to be handled. This is a necessity in both manually implemented systems which deal in nothing but hard copy as well as electronically implemented systems that deal only with electronic copies.

It is generally recognized by both types of systems, that there are two basic document control strategies that must be enforced in order to have an effective and efficient system. The first is that documents that are no longer needed should be deleted from the system as soon as possible and the second is that a document that is required should be maintained as long as it is needed by the document owner or the enterprise.

It is obvious that in implementing these two basic concepts it is not always possible to obtain an agreement, much less a consensus, on such items as to who makes the decision to keep or delete a document, does this decision apply to all document types or does it change with the type of document, can there be exceptions and changes in the criteria, who determines the time period for document types, etc.

The prior art systems that involve a large number of users who create electronic documents that are stored in the system at a logically centralized location, do generally impose a number of structured formatting constraints on the manner by which documents are identified in the system. In most systems, some type of document classification system is established, either on a formal basis or a de facto basis. A bank might use a functional business classification for documents. For example a customer's loan folder might include a "loan application", a "credit history", a "payment history" etc. These various documents have different retention requirements and there is generally no provision made to permit any deviations from the established retention criteria. In prior art systems, a search is performed on a specific term contained in a plurality of documents to be deleted. The term may have a different meaning within each of the documents. Thus, this form of document management may result in the deletion of documents which should not be deleted or the omission of documents which do not contain the term and should be deleted. A batch type of approach to document retention, where the date to delete the document is controlled by the enterprise, creates a problem when the date has to be changed. If the date that the document is to be deleted is shortened, there are undoubtedly some persons who are relying on the fact that the document is to be available up to the previously established date. How does the system administrator evaluate whether these documents can be destroyed. If the documents are deleted there is likely to be some direct adverse consequence to those persons who were relying on the document for their work. A more serious long term consequence however results when documents are destroyed early, in that there is a loss of integrity of the system which soon results in users operating their own backup document storage system which defeats the many advantages of a centralized system.

It is therefore important in electronic document storage systems to provide the user with as much flexibility as possible in as many areas as possible. The problem of providing flexibility to the user however almost always adds to the complexity of the process and requires the user to obtain and retain an understanding of all the various options available and the nuances of their differences. It is extremely important to have the data that is used to manage the retention and deletion of the documents, entered correctly into the system. The data entry process for the end user of the system must therefore be simple to use, yet permit a more sophisticated user to take advantage of the more advance features. The data entry process must also be fail safe to insure that only valid descriptors are entered into the system.

The invention described and claimed in the cross-referenced application Ser. No. 07/138,533 is directed to an improved method for use in an interactive information handling system in which the data entry process for the descriptors that are used in the retention and deletion of documents is simple, flexible, and fail safe, and therefore avoids many of the problems that occur with the prior art document storage systems.

The method of the invention disclosed and claimed in the cross-referenced application Ser. No. 07/138,231 involves a recognition of the respective document retention needs of the document owners and the document retention criteria of the enterprise that functions as the central administration of the system, by establishing a dual label and expiration dates for each document that is to be stored in the system. The first label is referred to as the Document Label (DL) and functions, for example, to identify the business use classification of the document. The second label is referred to as the Ownership Label (OL) and functions to identify a document classification assigned by the owner.

A separate expiration date is associated with each of the two labels. The ownership expiration date is set by the owner to indicate the length of time that the owner desires ownership of the document. Ownership implies the authority and responsibility for the document during the ownership period. A System Administrator (SA) for example establishes the allowable retention periods for each of the document labels. Each document filed in the system has associated with it the label and expiration date criteria that are employed to automatically manage the retention and deletion of documents from the system.

When a document is to be filed by the system, the retention and deletion selection criteria are entered into the system and stored in the system at the same time as the document. The information is entered into the system interactively by the end user by following a series of prompts presented on the screen of a display device by the system in response to the user having selected an option presented on a menu screen. Valid document labels are preferably pre-established so that the user selects a particular document label from an established and approved list. The default expiration date for that document label has been previously established by the enterprise and is preferably entered automatically. The end user may override the default expiration date with a valid expiration date. Valid ownership labels are also preferably pre-established by the document owner and are approved by the enterprise. The document owner can establish a default expiration date for each ownership label which can be entered automatically when the ownership label is entered. The end user may override the default expiration date for the specified ownership label with a valid expiration date. The ownership expiration date and the document expiration date may be tied together with an expiration rule. For example, for a given document label, the expiration dates must be equal.

Documents are automatically retained and deleted by processing the expiration date criteria associated with each document relative to a current date according to the following date relationships.

If the current date is less than both expiration dates, retain the document.

If the current date is greater than both expiration dates, delete the document.

If the current date is greater than the ownership expiration date but less than the enterprise expiration date, retain the document but transfer ownership to the system administrator or the designated user. Transfer is based on a preset list by ownership label by user.

If the current date is greater than the enterprise expiration date but-less than the ownership expiration date, retain the document.

The methods described in the above mentioned cross-referenced applications result in an effective and efficiently managed electronic document storage system. However, the system does not reflect any consideration for an end user who had access to the document prior to the time the document was deleted. Since the document may be deleted automatically when the ownership expiration date is reached or when the document expiration date is reached, the non-owner end user can suddenly discover that the document no longer exists in the system. One obvious solution to overcome such a problem is to allow the non-owner end user to make a copy of the document to guard against it's destruction. That solution may be acceptable for documents that are not revised or where the validity of the document's content will not change over time, but it is not a good overall solution to the basic problem.

The present invention is directed to a more general solution in which the non-owner end user is allowed to enter a request for a delayed copy of the document which is acted upon by the document owner at the time the document owner takes an explicit action to delete the document.

SUMMARY OF THE INVENTION

In accordance with the method of the present invention a non-owner of a document that wants to insure access to a specified document as a resource after the present owner no longer wants it, is allowed to enter a Delayed Copy Request (DCR) into the system which is stored with the document and reviewed by the document owner at the time the original copy of the document is to be deleted. The system has the flexibility to allow a plurality of requests from different end users and to select which of the requesting end users will be given their own copies, where each separate copy will be owned individually by each of the requesting end users.

At the time a specified document is to be deleted, the owner of that document is presented with a screen that identifies each end user who has requested a delayed copy. If the owner decides that the document should not be disseminated further because, for example the content is no longer valid and should not be relied on, then the owner has an option to deny all requests for a delayed copy. Alternately, the delayed copy requests can be handled selectively by the owner.

It is therefore an object of the present invention to provide an improved method for storing electronic documents.

Another object of the present invention is to provide an improved method for managing the retention of stored electronic documents in an information handling system.

A further object of the present invention is to provide an improved method for managing the retention of stored electronic documents in which an end user in the system can enter a request for a delayed copy of a document that is owned by another end user.

A still further object of the present invention is to provide an improved method for controlling the number of duplicate copies of a specified electronic document that will be stored in the system by allowing the system to provide a delayed copy at the time the original is to be deleted.

Objects and advantages other than those mentioned above will become apparent from the following description when read in connection with the drawing.

BRIEF DESCRIPTION OF THE DRAWING

FIGS. 4a-4f illustrate the screens presented to the end user who has indicated to the system that a delayed copy request is to be entered into the system.

FIGS. 7a-7f illustrate the screens presented to end user owner in deleting the document.

DESCRIPTION OF THE PREFERRED EMBODIMENT

Figure 1:
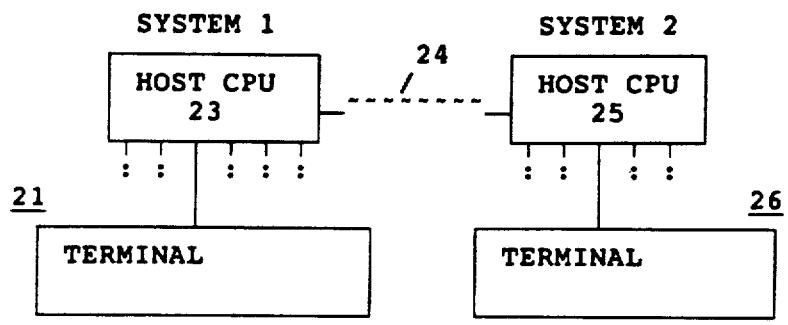
FIG. 1 is a block diagram of an information handling system in which the method of the present invention may be advantageously employed.
Figure 2:
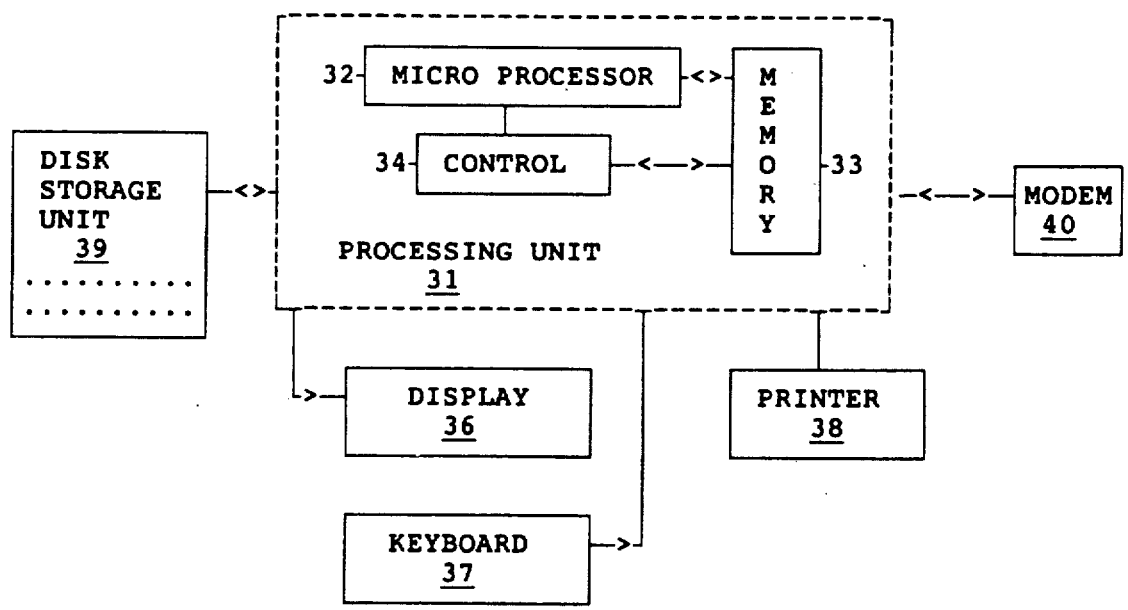
FIG. 2 is a block diagram of one of the interactive terminals employed by a user in the system of FIG. 1.

FIG. 1 illustrates an information handling system comprising a network of interactive type terminals or workstations of the type shown in detail in FIG. 2. As illustrated, the network includes a plurality of terminals 21 which are interconnected with each other and to a host central processing unit- 23. As shown in FIG. 1 host 23 in turn is connected via communication link 24 to a second host processing unit 25, which also connects to another network 26 of interactive workstations. Functionally, the system operates to allow each terminal to communicate with the host and to one or more other terminals using established communication protocols, so that the various serially connected communication links are transparent to the users. A user at one terminal can generate a document such as a letter and send that letter to the addressee at a designated node on the network. The user can then store the document in the system at some logically central system location. Each user of the system has the theoretical capability of retrieving that document at a later time. Such systems are well known in the art, and are currently in extensive commercial use. Since the general organization and operations of such systems is well known, only those details that are necessary for an understanding of the document storage method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual users or owners etc. It may also be assumed that the system shown in FIG. 1 processes information as various types of data objects such as text data objects, graphic data objects, and calendar data objects etc.

FIG. 2 illustrates the functional components of one of the interactive type data processing terminals shown in FIG. 1. The terminal comprises a processing unit 31 which includes a microprocessor block 32, a semiconductor memory 33, and a control block 34 which functions to control input/output operations in addition to the interaction between the micro processor block 32 and the memory unit 33.

The terminal further includes a group of conventional peripheral units including a display device 36, a keyboard 37, a printer 38, a disk storage unit 39, and a modem 40. Since the details of the above described functional blocks form no part of the present invention and can be found in the prior art, only a brief functional description of each block is set forth, along with a description of their interactions, sufficient to provide a person of ordinary skill in the art with a basis of understanding applicants' improved electronic document storage method.

Processing unit 31 corresponds for example to the "system unit" of a personal computer system such as the IBM XT, IBM AT or an IBM PS/2 system. Unit 31 is provided with an operating system program which may be one of the many versions of DOS (Disk Operating System) which is normally employed to run the systems. The operating system program is stored in memory 33 along with one or more application programs that the user has selected to run. Depending on the capacity of memory 33 and the size of the application programs, portions of these programs, as needed, may be transferred to memory 33 from the disk storage unit 39 which may include, for example, a 30 megabyte hard disk drive and a diskette drive. The basic function of the disk storage unit is to store programs and data that are employed by the system and which may readily be transferred to the memory unit 33 when needed. The function of the diskette drive is to provide a removable storage function for entering programs and data into the system, and a vehicle for storing data in a form that is readily transportable for use on other terminals or systems.

Display device 36 and keyboard 37 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data developed or stored in the system at some central location. Lastly, the modem 40 functions to transfer data from the terminal of FIG. 2 to a host system through one or more communication links which may be a commercial type link or a dedicated communication link.

Figure 3A:
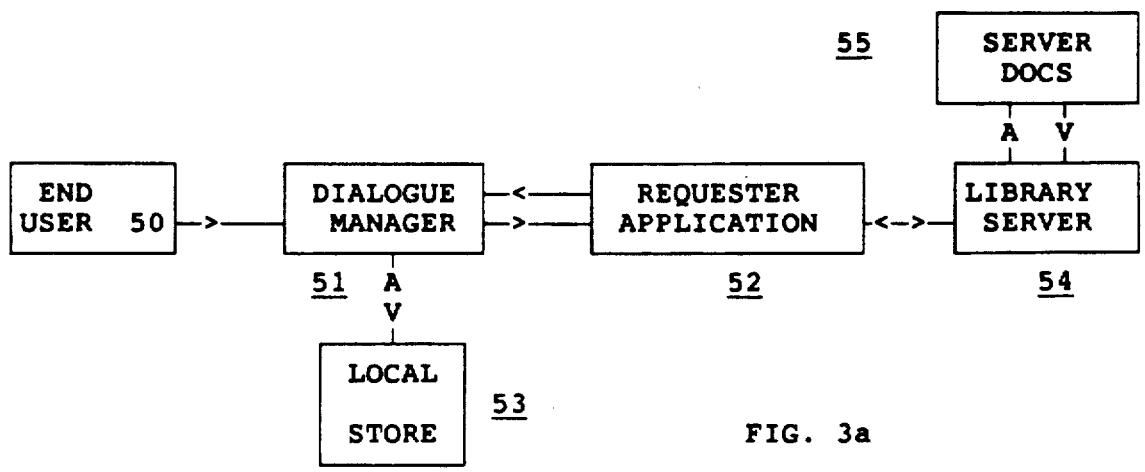
FIGS. 3a and 3b illustrate an overview of the document generation and storage process.
Figure 3B:
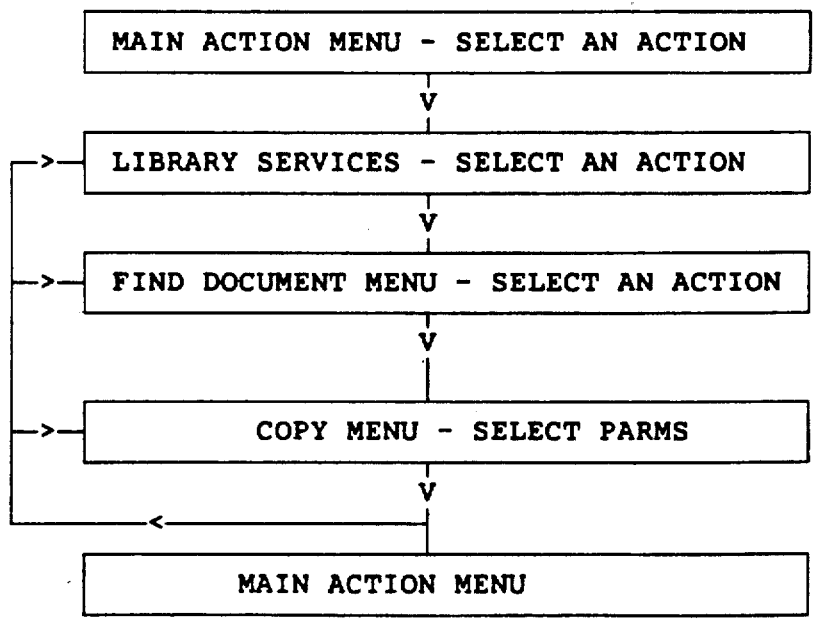

FIG. 3a represents an overview of the system from the standpoint of the major interactive steps involved in storing a document that has been created by an End User (EU). Block 50 represents the EU. Blocks 51 and 52 represent programs stored at the terminal while block 53 represents local disk storage. Blocks 54 and 55 represent the library server function located at the host and is the central depository for stored system documents. The program represented by block 51 is referred to as the Dialogue Manager application and functions to provide the necessary menus and prompts to obtain information from the user. It is essentially the interface to the user from the terminal. The program represented by block 52 is referred to as the requester application and functions to build requests and send them to the library server. The function of the library server is to validate/set labels and expiration dates and to file the document. The major steps involved include, first creating a document; second selecting the sub-action menu in order to set the document descriptors; thirdly setting the actual descriptors in the set document descriptor menu; and lastly filing the document.

The main action menu as described in the cross-referenced applications has three separate actions that the EU can designate. The action is selected in the normal manner by positioning the cursor adjacent the line on the menu and hitting the "enter" key. The system responds with a series of prompts which allows the user to create a document. For purposes of this description it can be assumed that the document is filed after it is created.

In order to store the document, descriptors must be assigned which assist in controlling the retention of the document up to a specified time and automatic deletion of the document after that time, in accordance with some predetermined strategy. A sub-action menu includes an option to "SET DESCRIPTORS" which is selected to enter the criteria that will be used to manage the retention and automatic deletion of documents from the system. When this option is selected the screen described in the cross-referenced application 07/138533 is displayed to the EU. The end user responds to the various prompts displayed by entering a name for the document label and a name for the ownership label. It should be assumed for purpose of this discussion that the respective names have been pre-established which is not necessarily a requirement of the system, but does simplify the description of the present invention. The expiration dates for the document and the ownership may be provided in a number of different ways. A list of allowable values can be obtained by placing the cursor under the appropriate field and pressing a predesignated key such as the "HELP" key. The allowable values which have been pre-established then appear in a "window" or on a separate screen which permits the user to copy or just select the choice by positioning the cursor and pressing the "ENTER" key. In the alternate a date can be inserted automatically based on the user's name, and the labels which have been entered providing an index into a stored table of approved dates. The document name and subject may be optional entries.

After all the data is entered and displayed on the screen, the end user presses the ENTER key and is returned to the sub-action menu. The "FILE" i.e. file document option is selected by positioning the cursor and again pressing the ENTER key.

The newly created document along with the labels and expiration dates are then stored in the system by the library server.

When an end user decides that a non owned document, that has been accessed on a regular basis by that end user, is an important resource and that the deletion of the document would have an adverse effect, the end user requests a delayed copy of the document by selecting a DCR option an a menu screen. In response to that selection the end user is presented with the screen shown in FIG. 4e which prompts the end user for information that is require by the system to service the DCR. As shown in FIG. 4a through 4f, a plurality of screens are presented to the end user in requesting the delayed copy of the document. The information defining the DCR is stored in specific fields of the data structure that is used by the system to manage the retention of that document in the system.

Figure 5A:
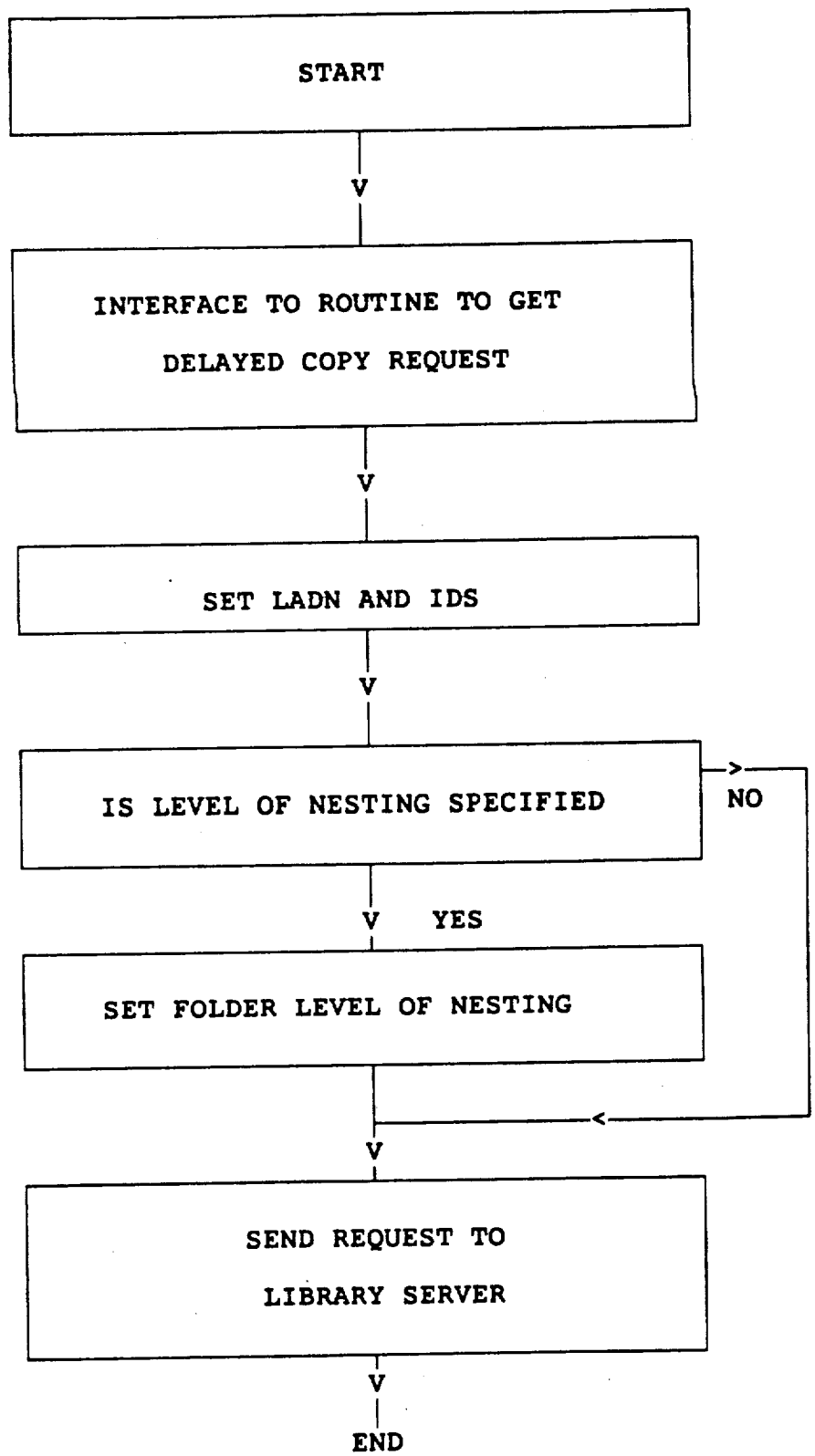
FIGS. 5a-5d is a flow chart summarizing the steps involved in entering the delayed copy request and storing it in the system.
Figure 5B:
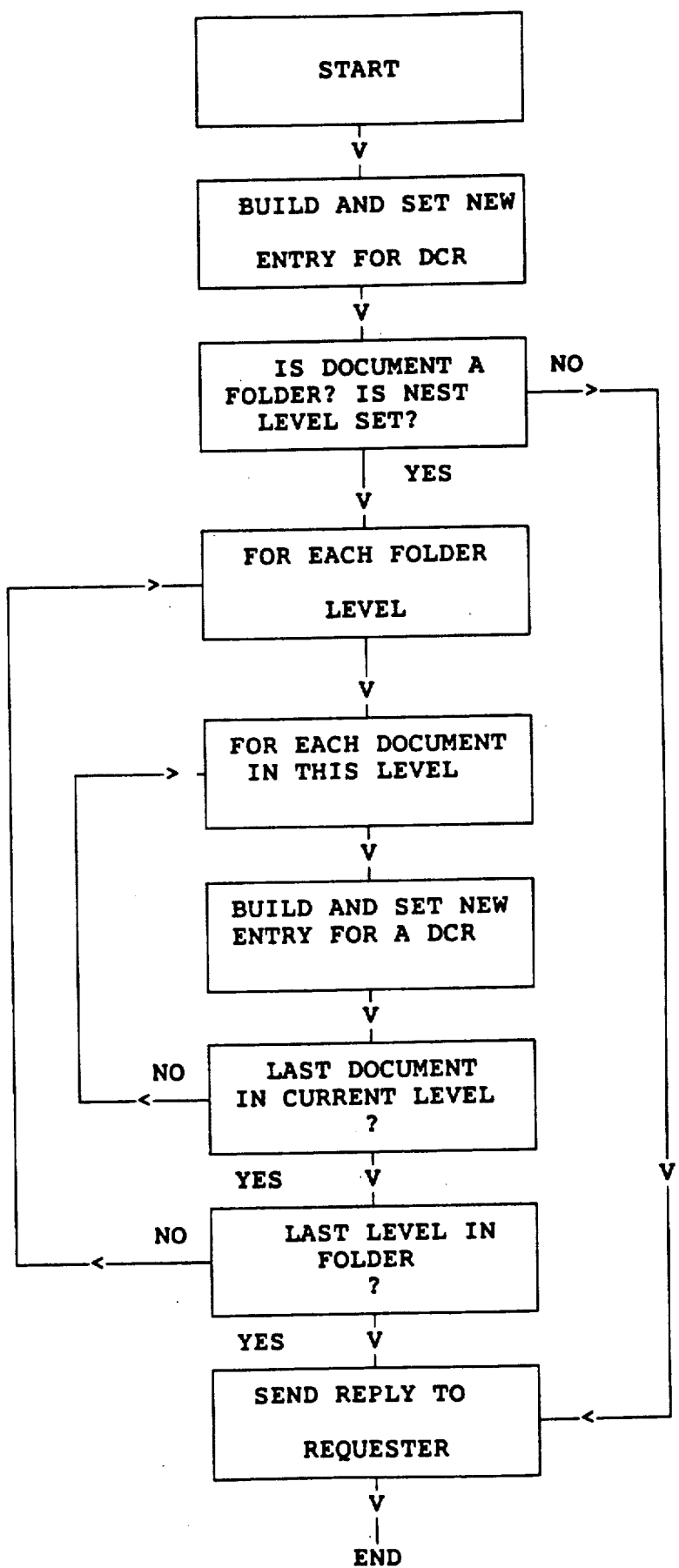
Figure 5C:
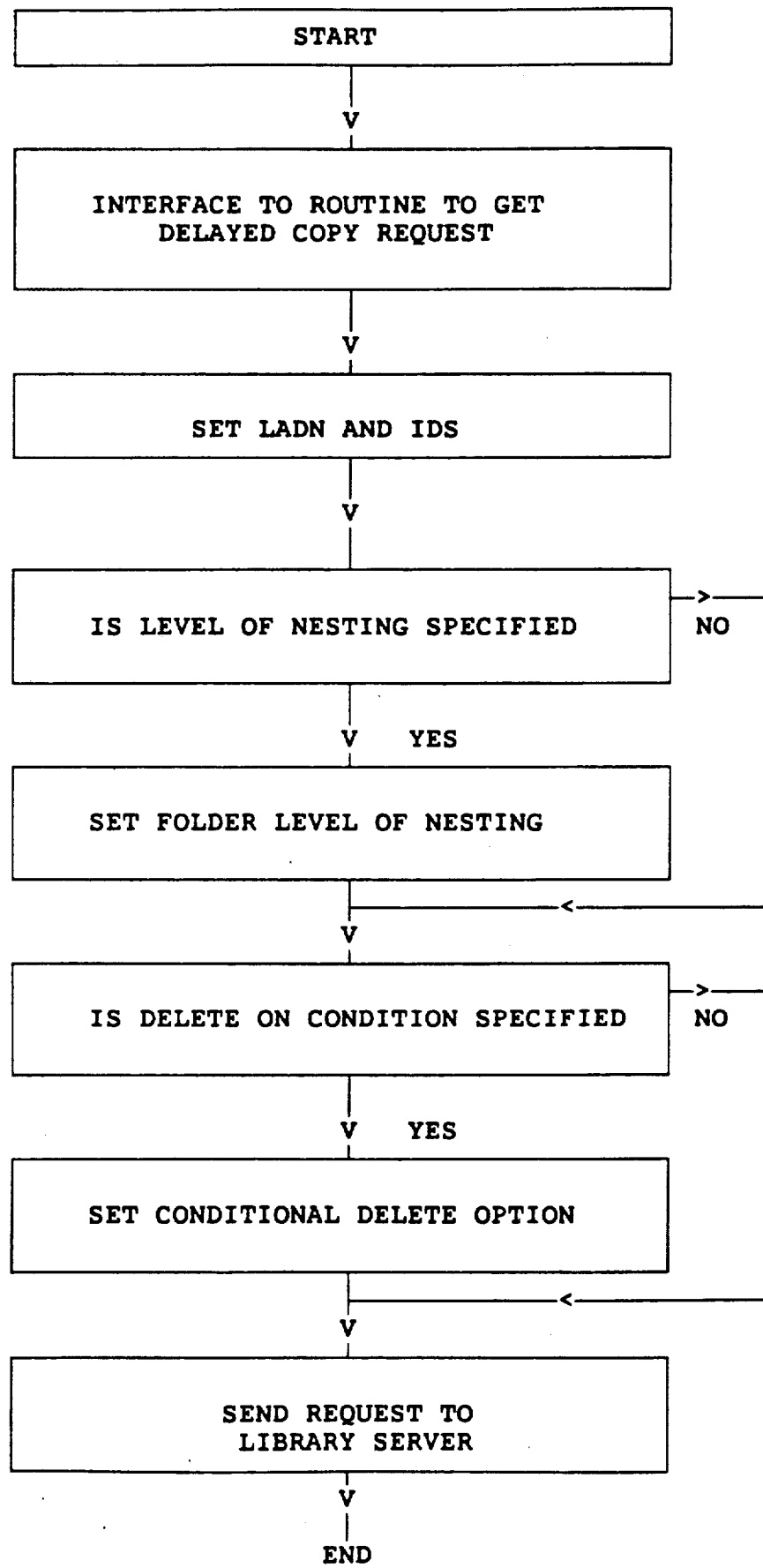
Figure 5D:
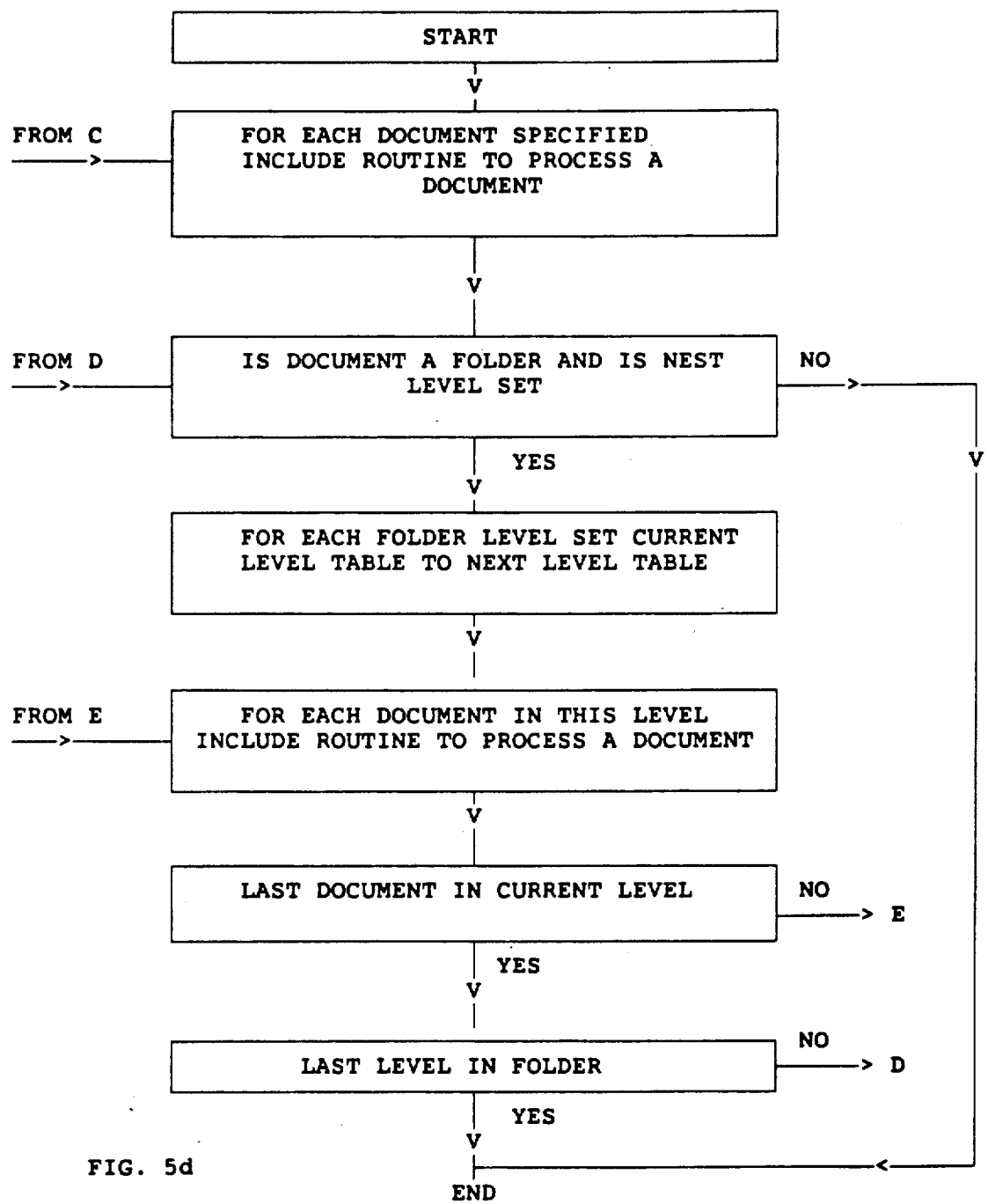

The flow chart shown in FIGS. 5a and 5b summarizes the steps involved in entering the DCR into the system.

Figure 6:
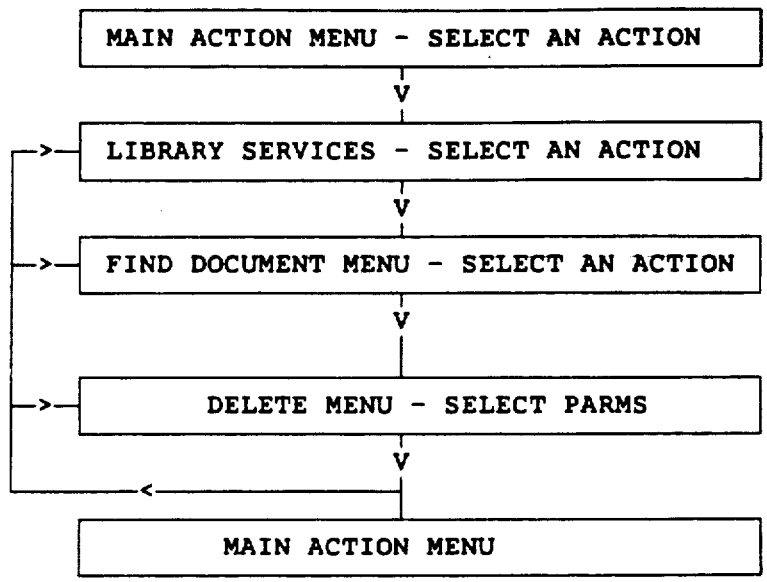
FIGS. 6 illustrates the screen presented to the end user owner of a document which has a delayed copy request attached at the time the owner's copy is to be deleted.
Figure 7A:
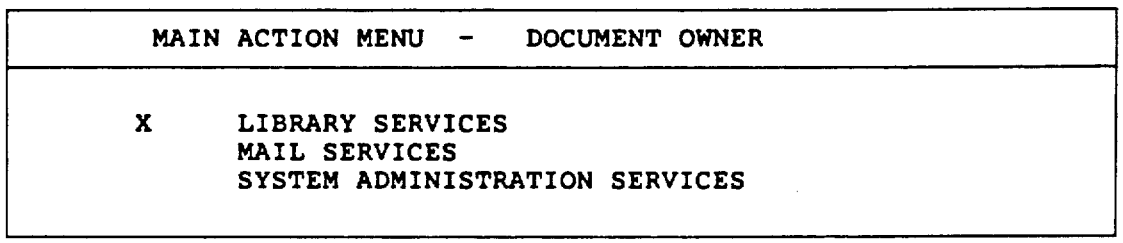
Figure 7B:
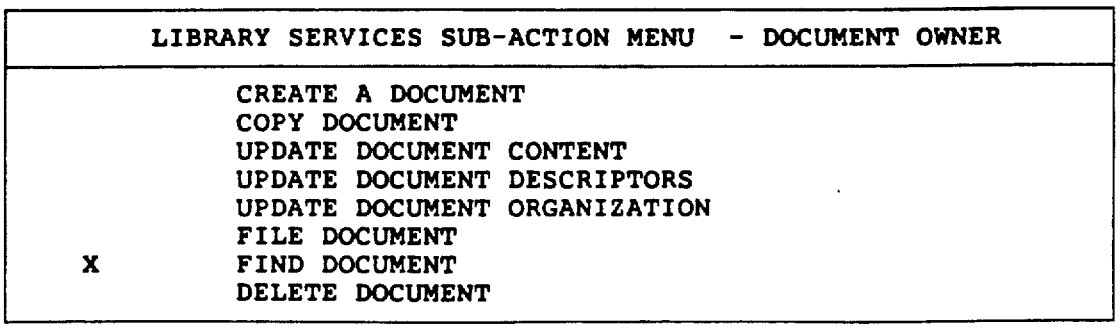
Figure 7F:
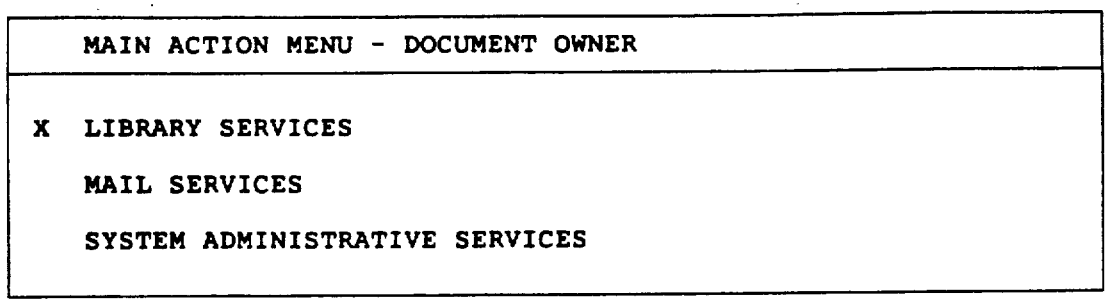

FIG. 6 shows a flow chart of menus which will be presented to the document owner in deleting a document from the system. FIGS. 7a through 7f illustrate a plurality of screens which are presented to the end user owner of a document that is to be deleted from the system. The event that causes the screen shown in FIG. 7e to be presented to the end user could be for example, the end user document owner explicitly deciding that the document should be deleted; the ownership expiration date being reached; or the document expiration date being reached.

As shown in FIG. 7e, the document owner end user may view additional information regarding the DCRs such as the date of the DCR and the name of the requestor. The system may be set up to purge DCR requests that are no longer valid by some pre-established standards. For example, end users who are no longer on the system, or DCRs that are more than a year old, etc.

The document owner in the preferred embodiment has the final decision on who gets a copy of the document. The system is preferably arranged to permit DCRs to be serviced selectively in that each request is treated independently of the others. In some situations because of the nature of the enterprise, the documents or the end users, the requests are either all denied or all allowed. The preferred embodiment does not allow DCRs to be selected. All requests are serviced or no requests are serviced.

In special situations, a predesignated individual could be given blanket approval for DCRs.

Figure 8A:
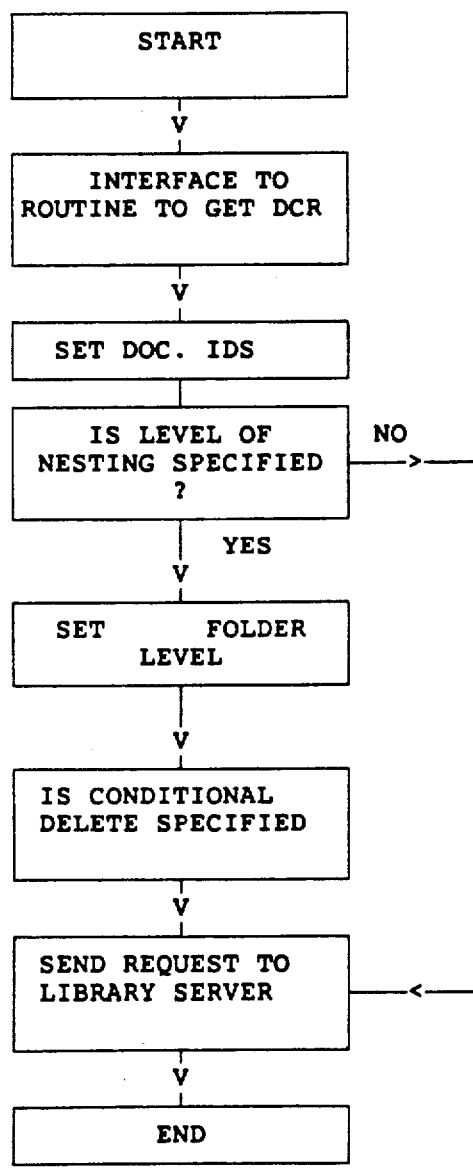
FIGS. 8a-8b is a flow chart setting forth the steps involved in the process of servicing the delayed copy requests attached to the owner's copy of the document.
Figure 8B:
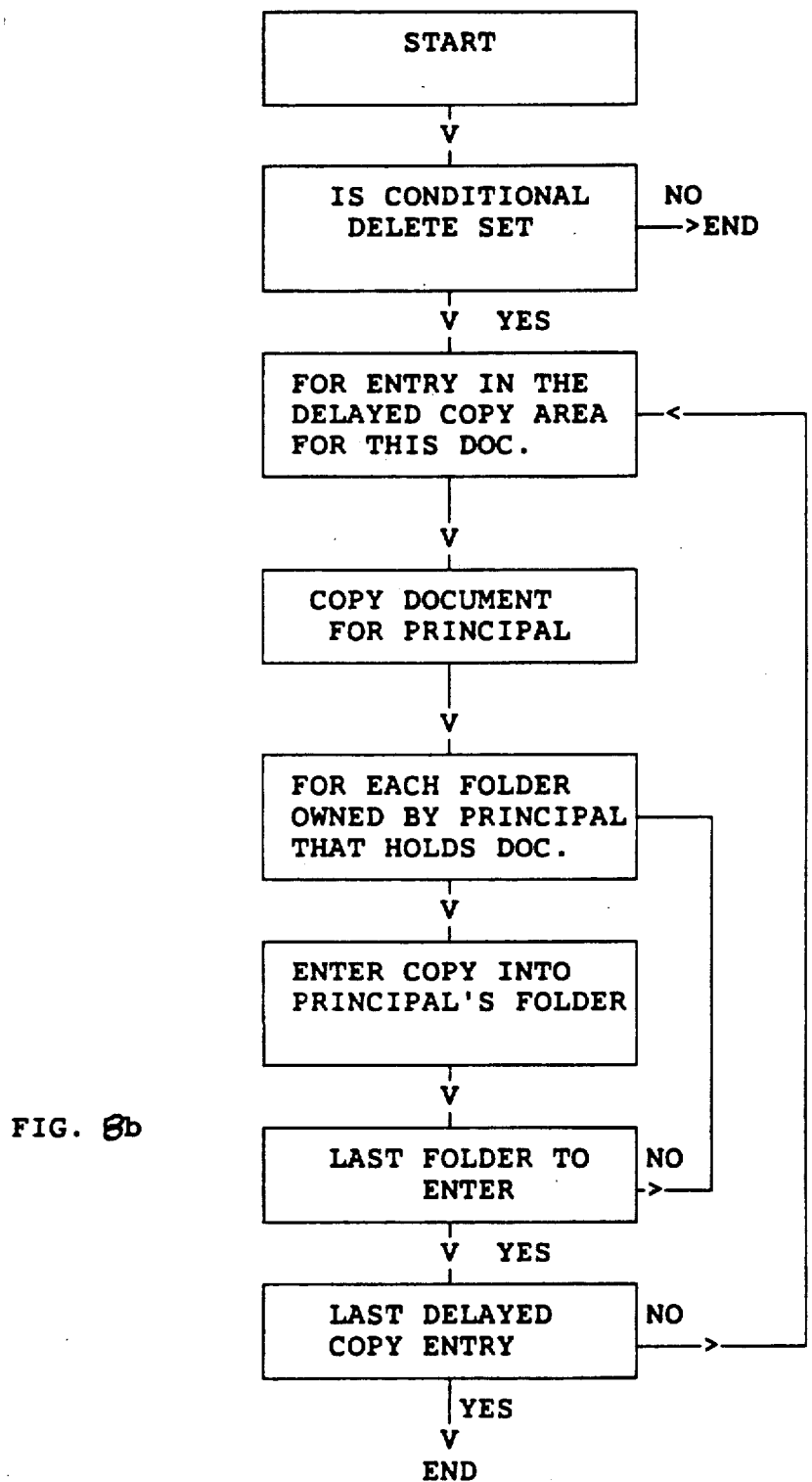

The flow charts of FIGS. 8a and 8b sets forth the steps involved in the process of the requester server processing a DCR (FIG. 8a) and the library server processing a delete request (FIG. 8b). The flow chart is at a level of detail to make it self explanatory so no additional description of the steps involved is deemed necessary.

The following is a list of pseudo-code programming statements which will be of interest and assistance to persons skilled in the art of programming interactive systems, who desire to practice the method of the present invention.

REQUESTER—DCR

The routine is called from a routine that interfaces with the End User (EU) to create the DCR.

INPUT

Requester/Principal IDs
Information about the document including;
Library document ID (LDID)
Folder level of nesting(optional)

PROCESS:

Set the LDID for the document to be copied.(1)
Set the requester and principal IDs (2)
If the folder level of nesting is specified (3)
Then, set the folder level of nesting as specified (4)
Endif (folder level of nesting is specified)
Send completed request to Library Server (LS)

(1) The Requester builds an operand for the document specified to be copied in the request. The operand includes a pointer to the physical location of the document.

(2) The Requester builds operands specifying the requester and principal identifiers for this command.

(3) If the document to be copied is a folder then all of the documents in the folder can be copied. If the folder level of nesting is not specified than only the document explicitly specified for copying is copied.
is built by the Requester, if the (4) An operand is built by the Requester, if the folder level of nesting is specified.

OUTPUT:

Requester/principal IDs
For the document specified to be copied in this request an operand is built containing a pointer to the location of the document.
Folder level of nesting.

Library Server:

This routine is called after the requester routine has processed the DCR.

INPUT:

The output of the requester.

PROCESS:

Do for document specified (1)
  Set the requester/principal IDs into a new entry in the delayed copy area for the specified document. (2)
  If the specified document is a folder and the folder level of nesting is specified (3)
    Do for every level specified (4)
      Do for document at the current level of nesting (5)
        Set the requester/principal IDs into a new entry in the Delayed Copy Area (DCA) for the current document
      Enddo (for every document at this level)
    Enddo (for every level specified)
  Endif (folder and folder level of nesting is specified)
Enddo (for document specified)

Notes:

(1) This is a loop for the Library Server (LS) to process each document explicitly specified to be delayed copied. More than one document may be specified.

(2) The LS creates a new entry in the DCA for each document that will be copied later.

(3) The EU can request that all or part of a folder be delayed copied.

(4) This is a loop for the LS to process each folder level.

(5) This is a loop for the LS to process each document within the current level.

OUTPUT

An entry in the DCA for each document to be delayed copied.

REQUESTER: (Delete Request)

The routine is called from a routine that interfaces with the End User (EU) to create a delete request for a user with delete authority.

INPUT

Requester/Principal IDs
Information about the document including;
Library document ID (LDID)
Folder level of nesting(optional)
Conditional or unconditional delete.

PROCESS:

Set the LDID for the document to be deleted.(1)
Set the requester and principal IDs (2)
If the folder level of nesting is specified (3)
Then, set the folder level of nesting as specified (4)
Endif (folder level of nesting is specified)
If the conditional delete option is specified (5)
Then, set the conditional delete option as specified.
Endif (conditional delete option is specified)
Send completed request to Library Server (LS)

NOTES:

(1) The Requester builds an operand for the document specified to be deleted in the request. The operand includes a pointer to the physical location of the document.

(2) The Requester builds operands specifying the requester and principal identifiers for this command.

(3) If the document to be deleted is a folder then all of the eligible documents in the folder can be deleted. If the folder level of nesting is not specified than only the document explicitly specified for deleting is deleted.

(4) An operand is built by the Requester, if the folder level of nesting is specified.

(5) An operand is built by the Requester, if the conditional delete option is specified.

OUTPUT:

Requester/principal IDs
For the document specified to be deleted in this request an operand is built containing a pointer to the location of the document.
Folder level of nesting.
Conditional delete option.

Library Server:

This routine is called after the requester routine has processed the Delete Requester (DR).

INPUT:

The output of the requester.

PROCESS:

Do for document specified (1)
Include individual document include process (2)
If the specified document is a folder and the folder level of nesting is specified (3)
  Do for every level specified (4)
    Set current level table to next level table (5)
    Do for each document at the current level of nesting (6)
      Include individual document include process
    Enddo (for every document at this level)
  Enddo (for every level specified)
Endif (folder and folder level of nesting is specified)
Enddo (for document specified)

Notes:

(1) This is a loop for the Library Server (LS) to process each document explicitly specified to be deleted. More than one document may be specified.

(2) The include process will do the following; Make a copy for each delayed copy principal. Enter the copy into each folder owned by the principal that currently contains the original. Save the folder table of contents for folder documents. Delete the document.

(3) If the document to be deleted is a folder document and the delete requester wishes to delete documents within the folder then the LS must process the folder nesting levels as specified.

(4) This is a loop for the LS to process each folder level.

(5) The LS gathers the list of documents at the next level in the next level table. When it is time to process the next level the list in the current level table must be set to next level table. During the processing of this level, the LS will gather the list of documents for the next level.

(6) This is a loop for the LS to process each document within the current level.

DOCUMENT COPY INCLUDE PROCESS:

If the conditional delete option is specified as Conditional Delete (CD) (1) then, Do for each entry in the Delayed copy document area (2)

Make a new copy of the document making the current principal the owner of the document (3).

Do for each folder owned by the current principal that contains the original document (4)

Enter the copy into the folder

Enddo (for every folder owned by principal)

Enddo (for every delayed copy entry)

Endif (conditional delete is specified)

If the current document is a folder then (5)

Save the current document's folder table of contents into the next level table (6)

Delete the current document.

NOTES:

(1) If the document is to be conditionally deleted, then a copy must be made for each principal requesting a delayed copy.

(2) This is a loop for the LS to process each entry in the delayed copy area for this document.

(3) The LS will create a new document for the principal. The document content will be copied exactly as will all of the user assigned descriptors. System assigned descriptors such as file-date-time and library assigned name will be set appropriately.

(4) This is a loop for the LS to process each document in folder entry for the original document. If the principal owns the folder, then the new copy will be entered into the folder.

(5) If the document to be deleted is a folder document, then the LS must process the folder nesting levels as specified.

(6) The LS gathers the list of documents at the next level in the next level table.

(7) The LS will delete the original document regardless of any options specified.

OUTPUT:

A new document for each delayed copy request, if the delete request specified a conditional delete.

Entries into each folder owned by the delayed copy requester.

While applicant has disclosed and illustrated a preferred embodiment of the improved method, it will be obvious to those persons skilled in the art of electronic document storage, that changes and modifications may be made without departing from the spirit of the invention or the scope of the appended claims.

I claim:

1. In a multi-user interactive information handling system which maintains a relatively large plurality of electronic documents in storage for users of said system, in which each electronic document of said plurality is assigned at a time said electronic document is stored, an ownership label, a document label that identifies said electronic document by document type, said criteria that is used by said system to automatically delete said electronic document from said system at some future time, said criteria including first and second expiration dates, said system periodically processing said criteria of said electronic documents relative to a current date to cause said system to automatically delete a specific electronic document if a pre-established relationship exists among said current date and said first and second expiration dates assigned to said specific electronic document, a method to selectively provide a stored electronic copy of a first said electronic document owned by a first user to a second user in response to servicing a Delayed Copy Request from said second user at a time said first electronic document is to be automatically deleted from said system, said method comprising the following steps in combination, A) assigning to said first electronic document said ownership label, said document label, and said criteria including said first and second expiration dates at the time said first electronic document is stored in said system including the interactive entry of at least one of said labels by said first user, B) entering into said system interactively by said second user a Delayed Copy Request for said first electronic document.

C) periodically processing said criteria of said stored documents to determine if said pre-established relationship exists for said first electronic document.

D) servicing said Request with said system only at the time said first electronic document as determined in Step C) is to be automatically deleted from said system, including the step of selectively honoring said Delayed Copy Request, and E) automatically deleting said first electronic document after said step of servicing is completed.

2. The method recited in claim 1 in which said step of servicing said Request includes the further steps of, A) storing said Request in said system, and B) making said copy of said first electronic document only at a time said first electronic document is to be deleted from said system.

3. A method for managing retention and automatic deletion of documents in an interactive information handling system including a plurality of end users and a plurality of interactive interconnected end user terminals which operate to enter and selectively display electronic documents stored in said system, in which a first end user enters a Request for a copy of a first electronic document owned by a second end user, which Request is subsequently serviced by said system only in response to detecting that said first electronic document is to be automatically deleted from said system, said first electronic document having a pair of expiration dates that are assigned to said first electronic document at a time said first electronic document is stored, said method comprising the following combination of steps;

A) periodically processing with said system said expiration dates assigned to said first electronic document relative to a current date to determine if a pre-established relationship exists among said dates, B) storing said Request in said system, C) determining with said system that said pre-established relationship exists among said current date and said dates assigned to said first electronic document, D) servicing said Request by providing a copy of said first electronic document to said first end user, when said pre-determined relationship exists, and E) deleting said first electronic document after said servicing step.

4. The method recited in claim 3 including the further step of,

A) said second user issuing a command interactively to said system prior to a time said predetermined relationship exists, requesting said first electronic document be deleted from said system.

5. The method recited in claim 4 further including the step of,

A) said first end user interactively entering said Request into said system by means of one of said terminals.

6. The method recited in claim 5 in which said step of interactively entering said Request includes the step of, A) displaying to said first end user a screen which prompts said first end user for information required by said system to implement said step of servicing.

7. The method recited in claim 6 including the further step of,

A) displaying to said second end user when said first electronic document is to be deleted, a screen setting forth information to enable said second end user to decide how said Request from said first end user should be serviced.

8. The method recited in claim 7 including the further steps of,

A) servicing said request by
        (1) making an electronic copy of said specified document for said first end user and,
        (2) deleting said first electronic document after said copy is made.

9. The method recited in claim 8 in which said system includes a third end user and said method further includes the step of, A) interactively entering a second Request for said first electronic document by said third end user through one of said terminals, and B) said step of servicing includes servicing said second Request by,
        (1) making another copy of said specified document for said third end user, and
        (2) delaying said step of deleting said first electronic document until after said another copy is made.

* * * * *

UNITED STATES PATENT AND TRADEMARK OFFICE
CERTIFICATE OF CORRECTION

PATENT NO. : 5,051,891
DATED : Sep. 24, 1991
INVENTOR(S) : Margaret G. MacPhail

It is certified that error appears in the above-identified patent and that said Letters Patent is hereby corrected as shown below:

Col. 12, line 14, please delete "said" and insert --and--;

line 39, please delete "." and insert --,--; and line 42, please delete "." and insert --,--.

Signed and Sealed this

Sixteenth Day of February, 1993

*Attest:*

STEPHEN G. KUNIN

*Attesting Officer*   Acting Commissioner of Patents and Trademarks